United States Patent [19]

Hwo et al.

[11] Patent Number: 4,725,505

[45] Date of Patent: Feb. 16, 1988

[54] POLYBUTYLENE BLEND FOR FORM AND FILL FILM PACKAGING

[75] Inventors: Charles C. Hwo, Sugarland, Tex.; Masaki Kohyama, Tokyo, Japan

[73] Assignee: Shell Oil Company, Houston, Tex.

[21] Appl. No.: 906,473

[22] Filed: Sep. 12, 1986

Related U.S. Application Data

[63] Continuation of Ser. No. 655,397, Sep. 27, 1984, abandoned.

[51] Int. Cl.$^4$ .............................................. B32B 27/32
[52] U.S. Cl. ..................................... 428/516; 428/349; 525/240; 525/198
[58] Field of Search ............... 428/516, 349; 525/240, 525/198

[56] References Cited

U.S. PATENT DOCUMENTS

| | | | |
|---|---|---|---|
| 3,332,921 | 7/1967 | Cleary | 260/88.2 |
| 3,972,964 | 8/1976 | Doentremont | 260/897 |
| 4,186,240 | 1/1980 | Matsuda et al. | 428/349 |
| 4,188,350 | 2/1980 | Vicik et al. | 525/232 |
| 4,230,767 | 10/1980 | Tsaka et al. | 428/349 |
| 4,275,120 | 6/1981 | Weiner | 428/516 |

FOREIGN PATENT DOCUMENTS 0135358 3/1985 European Pat. Off. .

*Primary Examiner*—Carman J. Seccuro
*Attorney, Agent, or Firm*—Wendy K. B. Buskop

[57] ABSTRACT

A polymer blend with good hot tack and a low and broad heat seal initiation temperature range for vertical and horizontal form and fill film packaging which contains a copolymer of butene-1 and propylene and a copolymer of propylene and ethylene.

3 Claims, 2 Drawing Figures

SINGLE SIDE COATED FILM STRUCTURE
(TWO LAYERS)

BP/PE BLEND
AS COATING

PP AS SUBSTRATE

TWO SIDE COATED FILM STRUCTURE
(THREE LAYERS)

BP/PE BLEND
AS COATING

PP AS SUBSTRATE

BP/PE BLEND
AS COATING

POLYBUTYLENE BLEND FOR FORM AND FILL FILM PACKAGING

This is a continuation, of application Ser. No. 655,397, filed Sept. 27, 1984, now abandoned.

BACKGROUND OF THE INVENTION

The present invention relates to a polymer blend and the film of the polymer blend as a surface layer or coating. More particularly, the invention relates to a polymer blend which may be coextruded on one or both sides of packaging film to give a sealing surface(s) which exhibits surprisingly excellent hot tack and heat sealability suitable for vertical and horizontal form and fill film packaging.

This invention addresses the unique problems associated with sealing vertical and horizontal form and fill packages. Packaging may be accomplished by filling with food, medical solutions, etc. from a horizontal position where the item is inserted into the package from a side opening in the package. Often times it is desirable to fill a package from a vertical position. This is often desirable when filling a bag with a free-flowing composition or with several items which would render a horizontal filling process cumbersome.

The form and fill film packaging requires good "hot tack" and it is desirable to have a low heat seal initiation temperature and broad seal temperature range. Hot tack may be defined as the bonding strength between two pieces of polymer film at the point immediately after their having been joined together by application of heat and while the polymer is in the semimolten/solidifying state. The vertical form and fill film packaging procedure requires a simultaneous sealing of the bottom seam of the package and filling of the package while the package is in a vertical position. Thus, the package is sealed by applying heat and the seal must attain sufficient strength to contain the filled materials while still hot, so that the material or product does not fall out the bottom seal. Not only does the weight of the material or product contribute to this tendency for the bottom seal to release, but in addition the pressure of air used to assist in transport of the product may exert an additional pressure against the seal.

In addition to good hot tack and a low and broad heat seal initiation temperature range, (1) a low coefficient of friction, (2) a high seal strength, and (3) good compatibility with other packaging materials are also important.

Heretofore, films for vertical and horizontal form and fill packaging have been deficient in one or more of these desired properties. A commonly used seal layer such as propylene-ethylene copolymer melts at a high temperature relative to the main packaging film; i.e. it has a high and narrow seal temperature range. In this case packaging speeds are slower than desired, energy consumption is high and damage to the main package may occur if heat seal temperature is not very closely controlled. An alternative sealing material has been the metal salts of an ethylene acrylic acid copolymer which have a poor coefficient of friction, and tend to stick on the forming mandrel during shaping of the package. These materials also have poor compatibility with other materials in the package so that reclaimability is poor.

SUMMARY OF THE INVENTION

Applicants have surprisingly discovered a polymer blend which overcomes the disadvantages of the known sealing coatings and exhibits all of the desired characteristics of a good seal coat. The blend of the present invention may be used advantageously for vertical form and fill film packaging (as well as for horizontal). This blend has the combination of low, broad seal temperature range, and a low coefficient of friction not found in seal layer compositions. The blend has good compatibility with other materials, particularly polypropylene, and has excellent seal strength. Most importantly and surprisingly, the blend additionally exhibits good hot tack over the low, broad heat seal initiation temperature range—a result that other polymer blends have heretofore failed to achieve.

For example, U.S. Pat. No. 4,230,767 discloses a packaging material with heat seal packaging properties composed of blends of a propylene-ethylene copolymer with a variety of other propylene olefin copolymers. The propylene ethylene copolymers in '767 have ethylene content of as low as 0.5 percent by weight. Nowhere in '767 is there disclosed film packaging suitable for vertical as well as horizontal form and fill methods which exhibits good hot tack. Nor does '767 disclose a film for vertical as well as horizontal form and fill packaging with a low and broad heat seal initiation temperature range.

Applicants have surprisingly found that a butene-propylene copolymer can provide said layers with a low, broad seal initiation temperature and surprisingly, that blends of propylene-ethylene copolymers that have been aged at elevated temperatures (55° C., tested at one (1), seven (7) and fourteen (14) days, and which have a minimum ethylene content of of 3.5% (not 0.5% as in '767), yield seal coats having not only excellent hot tack, but hot tack results not heretofore achieved by the typical blends of '767 or any other polymer blend which displays low, broad heat seal ranges for film. Applicants have found that the particular range of 3.5% to 10% ethylene content in the propylene-ethylene copolymer is critical to the polymer blend of the butylene-propylene copolymer in order to yeild a seal coat which possesses excellent hot tack, as well as a low and broad heat seal initiation temperature range.

Applicants have also found that blends of propylene-ethylene copolymers that are not aged at these elevated temperatures yield seal coats having excellent hot tack and low, broad heat seal ranges for the film at ethylene contents as low as 2.5%, which may be seen by the tables herein.

The seal coatings may be used on films of polypropylene homopolymers, copolymers or polypropylene blends.

THE DRAWINGS

DETAILED DESCRIPTION OF THE INVENTION

Figure 1:
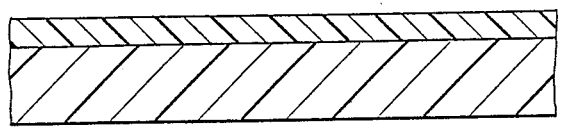
FIG. 1 is a two-layered view of a butene-1-propylene and propylene-ethylene copolymer film structure coated on one side of a polypropylene substrate.
Figure 2:
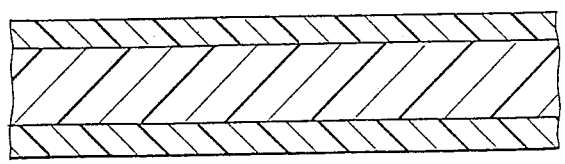
FIG. 2 is a three-layered view of a butene-1-propylene and propylene-ethylene copolymer film structure coated in both sides of a polypropylene substrate.

Hot tack test and heat seal initiation temperature tests were performed initally using a butene-1-propylene copolymer (R2598) with the properties outlined in Table 1 below.

TABLE 1

Butene-1-Propylene Copolymer (R2598) Properties

| $C_3=$, wt % by NMR | 19.8 |
| --- | --- |
| Melt index, g/10 minutes, ASTM D 1238 Condition "E" | 0.38 |
| Molecular weight, | |
| Mw | 716,000 |
| Mn | 145,000 |
| Mz | 2,140,000 |
| Melting Point (2nd Heat), °C. (DSC, @ 10° C./min) | 75.5 |

This butene-propylene copolymer was blended with different propylene hompolymers and propylene-ethylene copolymers which were then coextruded into cast films with a homopolymer polypropylene substrate. The coating is coextruded onto polypropylene, which may or may not be biaxially oriented. The sealing and hot tack tests were conducted by setting a heat sealer at the desired dwell and pressure. Two seconds and 20 psi were used. The air pressure was pre-set for a certain number of inches of water via a regulator and column and a specimen of about 3 inches long by 3 inches flat was placed onto a shovel and one end of the tube sealed off by adhesive tape. The shovel was brought to the jaws of the heat sealer with the distance between the seal bar edge and the end of the shovel at 2.5 cm and a timer was activated. The distance of the opening of the sealing portion immediately after the jaws opened was observed and then the air pressure was reset with a decrease in pressure and the subsequent steps followed until thee was a maximum pressure (hot tack) that gave an equal to or less than 0.3 cm seal opening.

EXAMPLE 1

Table 2 shows heat seal initiation temperature (HSIT) and the hot tack strength of the butene-1-propylene copolymer blended with homopolymer polypropylene and various propylene-ethylene copolymers, as well as those of a 100% propylene-ethylene commercial copolymer Dypro 431® from Arco as a standard. The hot tack strength of film was tested as fabricated and aged at room temperature for at least 24 hours. The commerical propylene-ethylene copolymer used in coating packaging film, Dypro 431® from Arco, was used as a standard. Millad in the amount of 0.2% by weight was added to improve clarity.

TABLE 2

BUTENE-1-PROPYLENE AND PROPYLENE-ETHYLENE RANDOM COPOLYMER FILM, HOT TACK STRENGTH AND HEAT SEAL INITIATION TEMPERATURE RANGE

| COATING BLENDS[1] | HSIT, °F.[2] | HOT TACK STRENGTH[3] INCH WATER PRESSURE TEMPERATURE, °F. | | | | | | | | | | |
| --- | --- | --- | --- | --- | --- | --- | --- | --- | --- | --- | --- | --- |
| | | 190 | 200 | 210 | 220 | 230 | 240 | 250 | 260 | 270 | 280 | 290 |
| #1 0% BP[4] + 100% ARCO DYPRO W431 (3 MF, 5% C$_2$) | 270 | <5 | <5 | <5 | <5 | <5 | <5 | <5 | <5 | 7.5 | 15 | 15 |
| #2 67% BP + 33% ARCO DYPRO W431 (3 MF, 5% C$_2$) | 175 | 15 | 15 | 15 | 15 | 15 | 15 | 15 | 15 | 15 | 15 | 15 |
| #3 60% BP + 40% ARCO DYPRO W431 | 170 | 12.5 | 15 | 15 | — | 15 | — | 15 | — | 15 | 15 | — |
| #4 60% BP + 40% PP DX 6018 (2 MF, 3.2% C$_2$) | 190 | 7.5 | 10 | 10 | 15 | 15 | 15 | — | 15 | — | 15 | — |
| #5 60% BP + 40% PP WRS 6-118 (10 MF, 3.2% C$_2$) | 200 | 7.5 | 10 | 12.5 | 15 | 15 | — | 15 | — | 15 | — | 15 |
| #6 60% BP + 40% PP DX 6016 (4 MF, 3.5% C$_2$) | 180 | 10 | 15 | — | 15 | — | 15 | — | 15 | — | 15 | — |
| #7 60% BP + 40% PP 5384 (1 MF, 0% C$_2$) | 205 | — | <2.5 | 5 | 7.5 | 2.5 | 2.5 | 2.5 | — | 2.5 | — | — |
| #8 60% BP + 40% PP WRS 6-135 (2 MF, 2.5% C$_2$) | 195 | 7.5 | 10 | 15 | 15 | 15 | 15 | — | 15 | 15 | — | — |

[1]Coating blends were applied on substrate of Shell DX 5096 by coextrusion and casting. Total film thickness = 1.25 mils. Coating Thickness = 0.2 to 0.45 mil. All films tested were as fabricated and room temperature aged for at least 24 hours.
[2]Defined as minimum sealing temperature for seal strength of 350 g/in.
[3]Requirement above 10" water pressure to be satisfactory.
[4]BP: A butene-1-propylene copolymer supplied by Mitsui Petrochemical Co., Japan, as identified in Table 1.

As may be seen from Table 2, the blend of 60% butene-1-propylene with 40% propylene-ethylene W431 copolymer (Formulation No. 3) gives the best hot tack, as well as the lowest heat seal initiation temperature. Formulation No. 1 is the commercially used propylene-ethylene copolymer, and contains 0% butene-1-propylene copolymer and 100% propylene-ethylene W431 copolymer. As may be seen, the heat seal initiation temperature is extremely high at 270° F. and the hot tack strength is not at an acceptable level until 280° F.

In contrast, Formulation No. 3, which is the preferred formulation, exhibited a heat seal initiation temperature of as low as 170° F., good hot tack of 12.5 inches at 190° F. as well as excellent hot tack strength in a range of 200° F. to 290° F. Even at 190° F., the hot tack strength of the 40% W431 blend, at 12.5 inches, was quite acceptable.

Formulation No. 8 illustrates the use of the WRS6-135 polymer at 2.5% by weight ethylene, resulting in a heat seal initiation temperature of 195° F. and an excellent hot tack strength (15") in a range of 210° F. to 290° F. In contrast, Formulation Nos. 4 and 5 (3.2% by weight ethylene at 2 and 10 melt flow, respectively), exhibited higher heat seal initiation temperatures (190° and 200°, respectively), and acceptable hot tack strengths only at 210° F. and 220° F. and above, respectively.

EXAMPLE 2

Table 3 shows heat seal initiation temperature (HSIT) and the hot tack strength of the butene-1-propylene copolymer blended with a homopolymer propylene and various propylene-ethylene copolymers, as well as those of a 100% propylene-ethylene commercial copolymer Dypro 431 from Arco as a standard. The copolymers were aged at 55° C. for one (1), seven (7) and fourteen (14) days, each, and hot tack ratings determined at each of these aging times for each copolymer. The commercial propylene-ethylene copolymer used in coating packaging film, Dypro 431 from Arco, was used as a standard and milled in the amount of 0.2% by weight was added to improve clarity.

TABLE 3

SCREENING OF PROPYLENE RANDOM COPOLYMER FOR GOOD HOT TACK STRENGTH

| COATING BLENDS[1] | Hot Tack Strength[2] Temperature Range, °C. | | | |
|---|---|---|---|---|
| | AS FABRICATED | AGED AT 55° C. 1 DAY | AGED @ 55° C. 7 DAYS | AGED @ 55° C. 14 DAYS |
| #1 BP[3] + 33% ARCO DYPRO 431 (3 MF, 5% C$_2$=) | EXCELLENT (87–138) | GOOD (110–138) | GOOD (126–138) | GOOD (126–138) |
| #2 BP + 40% ARCO DYPRO 431 (3 MF, 5% C$_2$=) | EXCELLENT (82–138) | EXCELLENT (117–138) | GOOD (121–138) | GOOD (121–128) |
| #3 BP + 40% SHELL PP DX 6018 (2 MF, 3.2% C$_2$=) | EXCELLENT (104–138) | FAIR | — | — |
| #4 BP + 40% SHELL PP WRS 6-118 (10 MF, 3.2% C$_2$=) | GOOD (99–138) | FAIR | — | — |
| #5 BP + 40% SHELL PP DX 6016 (4 MF, 3.5% C$_2$=) | EXCELLENT (92–138) | GOOD (99–138) | GOOD (115–138) | FAIR |
| #6 BP + 40% SHELL WRS 6-135 (2 MF, 2.5% C$_2$=) | EXCELLENT (99–138) | FAIR | POOR | — |
| #7 BP + 40% SHELL PP 5384 (1 MF, 0% C$_2$) | FAIR | POOR | — | — |

[1]Coating blends were applied on substrate of Shell DX 5096 by coextrusion and casting. Total film thickness = 1.25 mils. Coating Thickness = 0.2 to 0.45 mil. All films tested were as fabricated and room temperature aged for at least 24 hours.
[2]Requirement above 10″ water pressure to be satisfactory.
[3]BP: A butene-1-propylene copolymer with propylene comonomer content at 19.8 M % supplied by Mitsui Petrochemical Co., Japan, as identified in Table 1.

As may be seen from Table 3, Formulation #6 which contained 2.5% ethylene exhibited excellent hot tack strength at the time of fabrication but only fair hot tack strength after aging at 55° C. for only one (1) day. The hot tack strength was poor after seven (7) days.

In contrast, Formulation #5 which contained 3.5% ethylene exhibited good hot tack even after aging for seven (7) days, and a temperature range of 99°–138° C. and 115°–138° C. for one (1) and seven (7) days aging, respectively.

It may be desirable to add film processing aids and end use enhancement materials to the film. These may be added without inhibiting the hot tack and heat seal initiation temperature range results.

What is claimed is:

1. A polymer film aged at elevated temperatures of at least about 55° C. for one to fourteen days having good hot tack and a low and broad heat seal temperature range for vertical form and fill film packaging, comprising:
    a propylene or polypropylene-based copolymer or blend as a substrate or core layer; and
    a polymer blend as a surface layer, wherein said polymer blend comprises a butene-1-propylene copolymer having a propylene content of from about 12% by weight to about 30% by weight, a propylene-ethylene copolymer having an ethylene content of from about 2.5% by weight to about 10% by weight, and where said butene-1-propylene copolymer and said propylene-ethylene copolymer are combined in a weight proportion of from about 40:60 to about 75:25 and wherein said polymer film has an acceptable hot tack range of from about 200° F. to about 290° F., and a heat seal temperature range of from about 170° F. to about 290° F.

2. A polymer film aged at elevated temperatures of at least about 55° C. for one to fourteen days having good hot tack and a low and broad heat seal temperature range for vertical form and fill film packaging, comprising:
    a propylene or polypropylene-based compolymer or blend as a substrate or core layer; and
    a polymer blend as a surface layer, wherein said polymer blend comprises a butene-1-propylene copolymer having a propylene content from about 15% by weight to about 25% by weight, a propylene-ethylene copolymer having an ethylene content from about 5% by weight to about 7% by weight and wherein said butene-1-propylene copolymer and said propylene-ethylene copolymer are combined in a weight proportion of from about 60:40 to about 70:30 and wherein said polymer film has an acceptable hot tack range of from about 200° F. to about 290° F., and a heat seal temperature range of from about 170° F. to about 290° F.

3. A polymer film aged at elevated temperatures of at least about 55° C. for one to fourteen days having good hot tack and a low and broad heat seal temperature range for vertical form and fill film packaging, comprising:
    a polypropylene or propylene-ethylene copolymer as a substrate or core layer; and
    a polymer blend as a surface layer, wherein said polymer blend comprises a butene-1-propylene copolymer having a propylene content of about 20% by weight, a propylene-ethylene copolymer having an ethylene content of about 6% by weight, and where said butene-1-propylene copolymer and said propylene-ethylene copolymer are combined in a weight proportion of about 65:35 and wherein said polymer film has an acceptable hot tack range of from about 200° F. to about 290° F., and a heat seal temperature of from about 170° F. to about 290° F.

* * * * *